(12) United States Patent
Yamamoto et al.

(10) Patent No.: US 10,139,289 B2
(45) Date of Patent: Nov. 27, 2018

(54) TEMPERATURE MEASUREMENT DEVICE, LIGHT EMITTING MODULE AND TEMPERATURE MEASUREMENT METHOD

(71) Applicant: Tokyo Electron Limited, Tokyo (JP)

(72) Inventors: Takari Yamamoto, Miyagi (JP); Kenichiro Yamada, Miyagi (JP); Shinya Yamanaka, Miyagi (JP)

(73) Assignee: Tokyo Electron Limited, Tokyo (JP)

( * ) Notice: Subject to any disclaimer, the term of this patent is extended or adjusted under 35 U.S.C. 154(b) by 205 days.

(21) Appl. No.: 15/115,989

(22) PCT Filed: Feb. 25, 2015

(86) PCT No.: PCT/JP2015/055462
§ 371 (c)(1),
(2) Date: Aug. 2, 2016

(87) PCT Pub. No.: WO2015/133349
PCT Pub. Date: Sep. 11, 2015

(65) Prior Publication Data
US 2017/0176264 A1    Jun. 22, 2017

(30) Foreign Application Priority Data
Mar. 4, 2014 (JP) .................. 2014-042138

(51) Int. Cl.
*G01K 11/12* (2006.01)
*G01K 15/00* (2006.01)
*G01K 11/32* (2006.01)

(52) U.S. Cl.
CPC .............. *G01K 11/12* (2013.01); *G01K 11/32* (2013.01); *G01K 15/005* (2013.01)

(58) Field of Classification Search
CPC ...... G01K 11/12; G01K 11/32; G01K 15/005; G01K 11/00; H04B 10/506
See application file for complete search history.

(56) References Cited

U.S. PATENT DOCUMENTS

| | | | | | |
|---|---|---|---|---|---|
| 4,367,040 | A | * | 1/1983 | Goto ................... | G02B 6/2713 250/227.23 |
| 4,703,174 | A | * | 10/1987 | Anderson .............. | G01D 5/268 250/227.21 |
| 5,258,614 | A | * | 11/1993 | Kidwell ................ | G01K 11/32 250/227.14 |
| 5,446,280 | A | * | 8/1995 | Wang .................... | G01D 5/268 250/227.18 |

(Continued)

FOREIGN PATENT DOCUMENTS

| | | |
|---|---|---|
| JP | S58-144722 | 8/1983 |
| JP | S59-226999 | 12/1984 |

(Continued)

*Primary Examiner* — Lisa Caputo
*Assistant Examiner* — Philip Cotey
(74) *Attorney, Agent, or Firm* — IPUSA, PLLC (57) ABSTRACT

A temperature measurement device includes a light emitting part including a first light source configured to output measurement light with a first wavelength and a second light source configured to output reference light with a second wavelength, a light receiving part configured to receive reflected light of the measurement light and reflected light of the reference light that have passed through a temperature sensing device that changes light transmission characteristics with changes in temperature, a control part configured to measure a temperature detected by the temperature sensing device based on an amount of light of the received reflected light of the measurement light and an amount of light of the received reflected light of the reference light, and a temperature adjustment part configured to separately adjust the temperature of the first light source and the temperature of the second light source.

6 Claims, 9 Drawing Sheets

(56) References Cited

U.S. PATENT DOCUMENTS

| | | | | |
|---|---|---|---|---|
| 7,106,978 | B2* | 9/2006 | Nasu | H01S 5/02248 |
| | | | | 372/32 |
| 2003/0053169 | A1* | 3/2003 | Nasu | H04B 10/506 |
| | | | | 398/91 |
| 2005/0259716 | A1* | 11/2005 | Ito | G01J 5/0003 |
| | | | | 374/161 |
| 2005/0271116 | A1* | 12/2005 | Ito | G01J 5/0003 |
| | | | | 374/120 |
| 2006/0077394 | A1* | 4/2006 | Suzuki | G01J 5/0003 |
| | | | | 356/479 |
| 2010/0054298 | A1* | 3/2010 | Sasaoka | G01K 11/32 |
| | | | | 374/1 |
| 2011/0222581 | A1* | 9/2011 | Matsudo | G01K 11/00 |
| | | | | 374/161 |
| 2011/0231135 | A1* | 9/2011 | Suh | G01K 11/32 |
| | | | | 702/99 |
| 2013/0247589 | A1* | 9/2013 | Seo | G01B 9/02075 |
| | | | | 62/3.2 |
| 2014/0158872 | A1* | 6/2014 | Kallendrusch | A61B 18/22 |
| | | | | 250/227.23 |

FOREIGN PATENT DOCUMENTS

| | | |
|---|---|---|
| JP | S61-213738 | 9/1986 |
| JP | S61-232684 | 10/1986 |
| JP | S61-233331 | 10/1986 |
| JP | S62-085832 | 4/1987 |
| JP | H01-242931 | 9/1989 |
| JP | H07-142803 | 6/1995 |
| JP | 2008-286697 | 11/2008 |

\* cited by examiner

TEMPERATURE MEASUREMENT DEVICE, LIGHT EMITTING MODULE AND TEMPERATURE MEASUREMENT METHOD

TECHNICAL FIELD

The present invention relates to a temperature measurement device, a light emitting module and a temperature measurement method.

BACKGROUND ART

An optical temperature sensor is known that utilizes a temperature sensing device made of a semiconductor that changes its energy gap in response to changes in temperature (for example, see Patent Documents 1 through 5). This optical temperature sensor causes a signal light beam emitted from a first light emitting device and a reference light beam emitted from a second light emitting device to go through the temperature sensing device, and detects an external temperature based on the light intensity of each of the signal light beam and the reference light beam passing through the temperature sensing device.

PRIOR ART DOCUMENTS

Patent Documents

Patent Document 1: Japanese Laid-Open Patent Application Publication No. 62-85832
Patent Document 2: Japanese Laid-Open Patent Application Publication No. 61-213738
Patent Document 3: Japanese Laid-Open Patent Application Publication No. 61-233331
Patent Document 4: Japanese Laid-Open Patent Application Publication No. 1-242931
Patent Document 5: Japanese Laid-Open Patent Application Publication No. 61-232684

SUMMARY OF THE INVENTION

Problem to be Solved by the Invention

However, the detection value detected by the above-mentioned optical temperature sensor may vary due to the structure of the temperature sensor.

Moreover, in a temperature measurement device that measures a temperature of a measurement object based on the detection value by the optical temperature sensor, accuracy of the measured value, responsiveness and stability may deteriorate depending on an ambient temperature and on individual differences between different temperature measurement devices.

In response to the above matters, one embodiment of the present invention aims to provide an optical temperature sensor and a temperature measurement device that have excellent responsiveness and stability and can improve temperature measurement accuracy.

Means for Solving the Problem

According to an embodiment of the present invention, there is provided a temperature measurement device including:
a light emitting part including a first light source configured to output a measurement light beam with a first wavelength and a second light source configured to output a reference light beam with a second wavelength;
a light receiving part configured to receive a reflected light beam of the measurement light beam and a reflected light beam of the reference light beam, the reflected light beam of the measurement light beam and the reflected light beam of the reference light beam having passed through a temperature sensing device that changes light transmission characteristics with changes in temperature;
a control part configured to measure a temperature detected by the temperature sensing device based on an amount of light of the received reflected light beam of the measurement light beam and an amount of light of the received reflected light beam of the reference light beam; and
a temperature adjustment part configured to adjust a temperature of the first light source and a temperature of the second light source separately from each other.

According to another embodiment of the present invention, there is provided a light emitting module including:
a first light source configured to output a measurement light beam with a first wavelength;
a second light source configured to putput a reference light beam with a second wavelength; and
a temperature adjustment part configured to adjust a temperature of the first light source and a temperature of the second light source separately from each other.

According to another embodiment of the present invention, there is provided a temperature measurement method, the method including steps of:
outputting a measurement light beam with a first wavelength from a first light source;
outputting a reference light beam with a second wavelength from a second light source;
receiving a reflected light beam of the measurement light beam and a reflected light beam of the reference light beam, the reflected light beam of the measurement light beam and the reflected light beam of the reference light beam having passed through a temperature sensing device that changes light transmission characteristics with changes in temperature;
measuring a temperature detected by the temperature sensing device based on an amount of light of the received reflected light of the measurement light beam and an amount of light of the received reflected light beam of the reference light beam; and
adjusting a temperature of the first light source and a temperature of the second light source separately from each other.

Advantageous Effect of the Invention

According to an embodiment of the present invention, an optical temperature sensor and a temperature measurement device that have excellent responsiveness and stability and can improve temperature measurement accuracy.

EMBODIMENTS FOR IMPLEMENTING THE INVENTION

In the following, embodiments of the present invention are described with reference to the accompanying drawings. Note that elements having substantially the same functions or features may be given the same reference numerals and overlapping descriptions thereof may be omitted.

[Optical Temperature Sensor]

Figure 1:
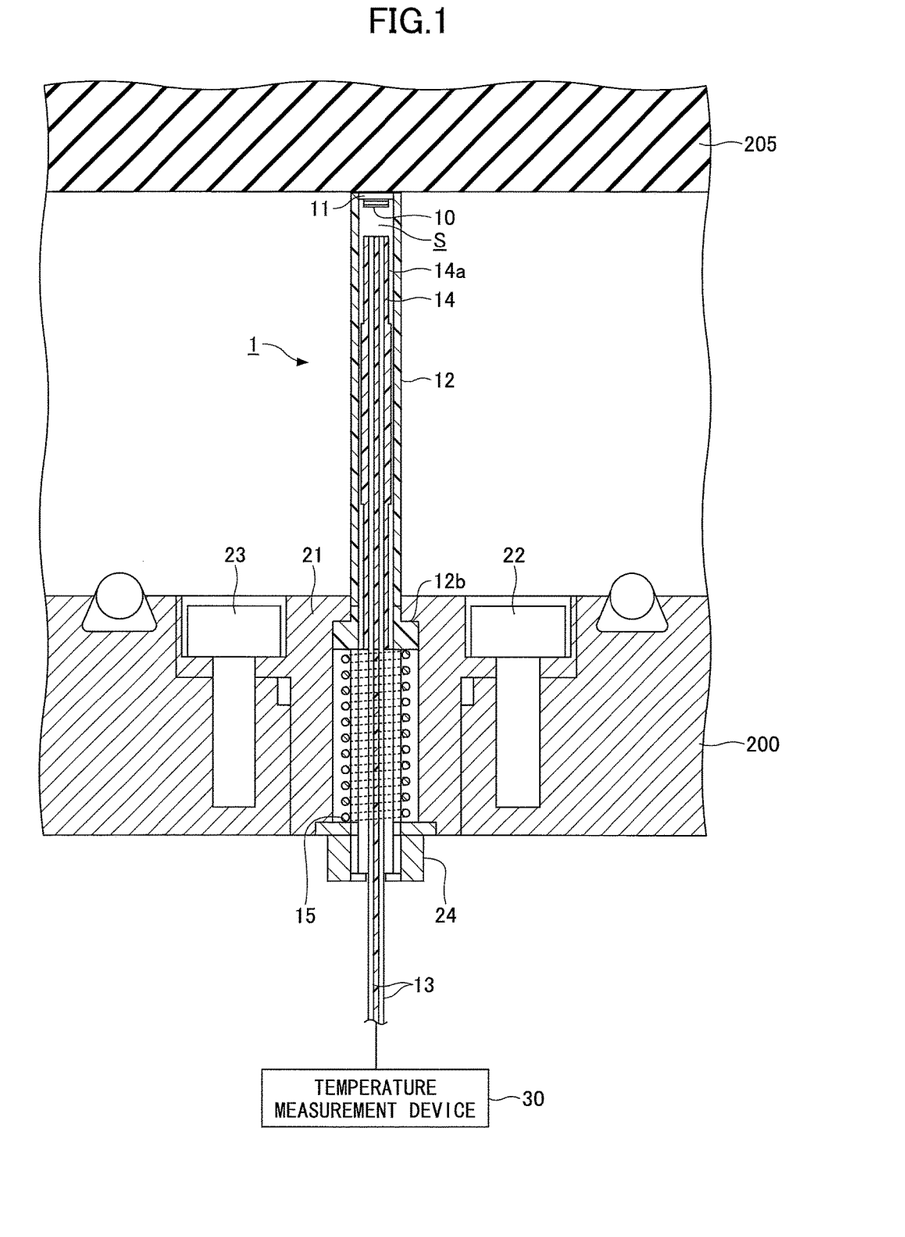
FIG. 1 is an overall configuration diagram of an optical temperature sensor according to an embodiment.

To begin with, an optical temperature sensor 1 according to an embodiment of the present invention is described below with reference to FIG. 1. FIG. 1 is an overall configuration diagram of the optical temperature sensor according to the embodiment. The optical temperature sensor 1 is a temperature sensor using an optical fiber, and uses a chip that is made of a semiconductor compound and varies its optical absorption wavelength with changes in temperature (heat sensitive medium). That is, the optical temperature sensor 1 is a semiconductor-absorption-wavelength-type temperature sensor that detects a temperature by utilizing a heat sensitive medium that varies its absorption wavelength of light that allows the light to travel therethrough depending on the temperature.

The optical thermal sensor 1 includes a heat sensitive medium 10, a heat transfer aluminum plate 11, a holding cylinder 12, an optical fiber 13, a securing member 14, and a spring 15. The heat sensitive medium 10 is made of a compound semiconductor of gallium arsenide GaAs. An aluminum reflective film is formed on an upper surface of the heat sensitive medium 10 and an antireflective film is formed on a lower surface of the heat sensitive medium 10. The heat sensitive medium 10 is an example of a temperature sensing device that changes light transmission characteristics with changes in temperature. The temperature sensing device is not limited to the compound semiconductor of gallium arsenide GaAs as long as the temperature sensing device is made of material that changes light transmission characteristics with changes in temperature.

The upper surface of the heat sensitive medium 10 is fixed to the heat transfer aluminum plate 11 having high thermal conductivity with an adhesive. A structure of a tip of the optical temperature sensor 1 is described below. The tip of the holding cylinder 12 is opened, and the heat transfer aluminum plate 11 on which the heat sensitive medium 10 is attached is inserted into the opening. Thus, the opening of the holding cylinder 12 is closed, and the heat sensitive medium 10 is fixed to the tip in the holding cylinder 12.

The holding cylinder 12 has a cylindrical shape and let the optical fiber 13 run therein. The holding cylinder 12 is an example of a holder that holds the temperature sensing device. The holder may not be famed into a cylindrical shape as long as the holder is a hollow member that allows the optical fiber 13 to run vertically.

The optical fiber 13 has a two-core structure. The securing member 14 is fixed to the holding cylinder 12 by adhesive while surrounding the optical fiber 13. Thus, the optical fiber 13 is arranged so that the top surface of the optical fiber 13 is positioned at the tip of the optical temperature sensor 1 while vertically running.

In the present embodiment, an electrostatic chuck (ESC) is cited as an example of a temperature measurement object 205. A temperature of the temperature measurement object 205 is transmitted to the heat sensitive medium 10 through the heat transfer aluminum plate 11. Hence, when heat exchange is performed between the heat sensitive medium 10 and at least one of the holding cylinder 12, the optical fiber 13, and the securing member 14, a temperature (detection value) of the temperature measurement object 205 detected by the heat sensitive medium 10 has a margin of error, and accuracy as a temperature sensor becomes worse.

Therefore, the optical temperature sensor 1 according to the present embodiment has a structure where the top surface of the heat sensitive medium 10 does not contact the top surfaces of the optical fiber 13 and the securing member 14. In other words, the top surface of the optical fiber 13 is arranged so as to face the heat sensitive medium 10 at a position distant from the heat sensitive medium 10 by a predetermined distance. Thus, a hollow part S is formed between the top surfaces of the optical fiber 13 and the heat sensitive medium 10 facing each other. The distance between the heat sensitive medium 10 and the top surface of the optical fiber 13 is appropriately set by adjusting positions of the heat sensitive medium 10 and the optical fiber 13 facing to each other while rotating the holding cylinder 12 based on the basis of designed values (e.g., 2.55 mm to 2.65 mm). The appropriate setting of the above-mentioned distance in a specific manufacturing process is described later in describing a method of manufacturing the optical temperature sensor 1.

Moreover, the optical temperature sensor 1 according to the present embodiment has a structure in which the temperature of the heat sensitive medium 10 is difficult to transmit to the holding cylinder 12 or the optical fiber 13 side. Thus, improvement of the temperature measurement accuracy and a response speed in response to a temperature change of the measurement object can be achieved.

More specifically, the holding cylinder 12 attached to the heat transfer aluminum plate 11 is made of a material with low thermal conductivity, excellent mechanical strength, and high heat resistance. For example, the holding cylinder 12 and the securing member 14 may be made of a plastic structure with low heat conductivity (PPS: Polyphenylene sulfide).

Furthermore, a contact area between the holding cylinder 12 and the heat transfer aluminum plate 11 is made as small as possible to prevent the heat transfer. In addition, the holding cylinder 12 and the securing member 14 are formed as thin as possible so as to reduce the heat transfer. In particular, a diameter (thickness) at and near the tip close to the heat sensitive medium 10 of the securing member 14 is formed smaller than the diameter (thickness) of a portion lower than the tip. In this manner, a shoulder falling part 14a for reducing the thickness at and near the tip close to the heat sensitive medium 10 is famed in the securing member 14. Thus, in the shoulder falling part 14a, a space is formed between the side portion of the securing member 14 and the holding cylinder 12, thereby reducing the contact area between the securing member 14 and the holding cylinder 12. This configuration makes it possible to reduce the amount of heat of the heat sensitive medium 10 to be transferred to the holding cylinder 12 and the securing member 14 sides, thereby improving the response speed in response to the temperature change of the measurement object.

A protruding part 12b, having a diameter larger than the upper part of the holding cylinder 12 and protruding outward, is formed in a lower part of the holding cylinder 12. For example, a spring 15 is provided in the space between the optical fiber 13 and the holding cylinder 12 in the holding cylinder 12 famed by the protruding part 12b. The holding cylinder 12 is fitted in a flange 21 made of aluminum, and is fixed to a pedestal 200 by fixing the flange 21 with, for example, screws 22 and 23. A bush 24 made of aluminum is provided on the lower side of the flange 21. The spring 15 is fixed to the upper surface of the bush 24 by fixing the flange 21 with the screws 22 and 23.

The tip of the optical temperature sensor 1 is configured to allow the temperature of the temperature measurement object 205 through the heat transfer aluminum plate 11. In the present embodiment, the holding cylinder 12 is pushed upward by extension and contraction of the spring 15, and the tip of the optical temperature sensor 1 is pressed against the lower surface of the temperature measurement object 205. Thus, by pressing the heat transfer aluminum plate 11 against the lower surface of the temperature measurement object 205, heat transfer between the temperature measurement object 205 and the heat transfer aluminum plate 11 can be stably performed, thereby stably performing the temperature detection by the heat sensitive medium 10. The strength of the reaction force of the spring 15 is set to a minimum force that can ensure a sufficient contact area between the heat transfer aluminum plate 11 and the temperature measurement object 205 and stably measure the temperature of the temperature measurement object 205, but does not apply an excessive force to the temperature measurement object 205.

Light of an LED output from a temperature measurement device 30 passes through the optical fiber 13, goes through the heat sensitive medium 10, is reflected from the lower surface of the temperature measurement object 205, goes though the heat sensitive medium 10 again, passes through the optical fiber 13, and is received by the temperature measurement device 30.

[Method of Manufacturing Optical Temperature Sensor]

Figure 2:
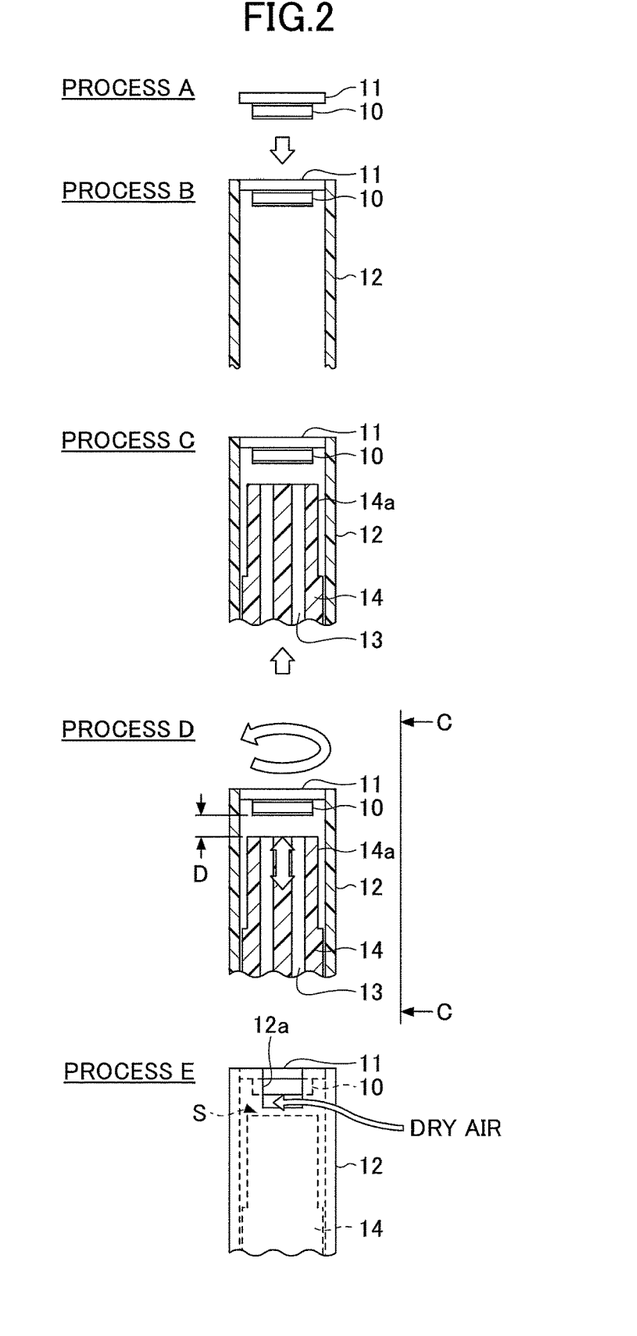
FIG. 2 is a diagram illustrating a method of manufacturing an optical temperature sensor according to an embodiment.

Next, a method of manufacturing the optical temperature sensor 1 according to the present embodiment is described below with reference to FIG. 2. FIG. 2 illustrates the method of manufacturing the optical temperature sensor according to an embodiment. Here, before starting the manufacture of the optical temperature sensor 1, a cutout part 12a is famed in a side surface of the tip of the holding cylinder 12 as illustrated at the lowest figure of FIG. 2.

(Process A)

To begin with, a heat sensitive medium 10 made of gallium arsenide GaAs is adhered to a lower surface of a heat transfer aluminum plate 11.

(Process B)

In this state, the heat transfer aluminum plate 11 is adhered to a holding cylinder 12 so as to close an opening at the tip of the holding cylinder 12.

(Process C)

Next, the optical fiber 13 integrated with a securing member 14 is inserted into the holding cylinder 12.

(Process D)

Subsequently, the holding cylinder 12 is rotated while adjusting a distance D between the tip of the optical fiber 13 and the heat sensitive medium 10. At this time, an LED installed in a temperature measurement device 30 emits a light beam. The light beam passes through the optical fiber 13 and is emitted from the tip and passes through the heat sensitive medium 10. The light beam reflected from the measurement object passes through the heat sensitive medium 10, passes through the optical fiber 13, and is received by the temperature measurement device 30. An appropriate position of the heat transfer medium 10 in a rotational direction so as hardly to generate an individual difference of the optical temperature sensor 1 is searched for based on the amount of light (measured value) of the received reflected light beam, and an appropriate distance D between the top surface of the optical fiber 13 and the heat sensitive medium 10 is searched for. A side wall of a securing member 14 is adhered to the holding cylinder 12 while maintaining facing positions (distance D) of the heat sensitive medium 10 and the top surface of the optical fiber 13 that are appropriately adjusted as a result of the search.

In the above manufacturing method, a hollow part S with a distance of D is famed between the top surface of the optical fiber 13 and the heat sensitive medium 10. The distance D between the top surface of the optical fiber 13 and the heat sensitive medium 10 has a design reference value. However, in the present embodiment, the position of the top surface of the optical fiber 13 is adjusted in the vertical direction while rotating the holding cylinder 12 and keeping the top surface of the optical fiber 13 apart from the heat sensitive medium 10. Thus, the distance D between the top surface of the optical fiber 13 and the heat sensitive medium 10 can be finely adjusted from the design reference value while adjusting the position of the heat sensitive medium 10 in the rotational direction relative to the center axis of the holding cylinder 12. This causes the facing positions of the heat sensitive medium 10 and the top surface of the optical fiber 13 to be appropriately adjusted.

Advantages of the optical temperature sensor 1 in which the position of the heat sensitive medium 10 in the rotational direction and the distance D between the top surface of the optical fiber 13 and the heat sensitive medium 10 are appropriately adjusted, are described below. The optical temperature sensor 1 detects the temperature by using the heat sensitive medium 10 that changes its optical absorption wavelength depending on the temperature. When manufacturing the optical temperature sensor 1, the position or an angle of the heat sensitive medium 10 may not be constant when adhering the heat sensitive medium 10 to the heat transfer aluminum plate 11 (process A). Because of this, by finely adjusting the distance D between the top surface of the optical fiber 13 and the heat transfer medium 11 while rotating the holding cylinder 12, the amount of reflected light after passing through the heat sensitive medium 10 (measured value) is set to become a specified amount of light. By doing this, in the method of manufacturing the optical temperature sensor 1 according to the present embodiment, the individual difference of the tip of the optical temperature sensor 1 including the heat sensitive medium 10 as a structure can be reduced, and a degree of accuracy of the temperature measured by the optical temperature sensor 1 can be improved.

(Dew Condensation Prevention)

(Process E)

A process E is a diagram illustrating a side view of the tip of the optical temperature sensor 1 as seen from a C-C plane illustrated in the process d. When water vapor condenses on the heat sensitive medium 10, accurate temperature measurement is difficult. Therefore, water vapor needs to be prevented from condensing in the hollow space S. To achieve this, the cutout 12a is formed in the side surface of the tip of the holding cylinder 12. The cutout part 12a is in communication with the hollow part S. Thus, the space in which the heat sensitive medium 10 is arranged is not sealed, and is structured to allow outside air to flow thereinto. Moreover, the cutout part 12a may allow dry air to flow into the hollow part S, and may allow the dry air to circulate around the position to which the heat sensitive medium 10 is attached. This can prevent moisture from mixing into the hollow part S and can prevent dew from condensing on the tip of the optical temperature sensor 1. Thus, the temperature of measurement object can be stably measured.

As discussed above, the configuration of the optical temperature sensor 1 and the method of manufacturing the same according to the present embodiment have been described. In the optical temperature sensor 1 according to the present embodiment, the light beam emitted from the end surface of the optical fiber 13 is caused to pass through the heat sensitive medium 10. The transmitted light beam is reflected from a surface contacting with the measurement object of the heat transfer aluminum plate 11. The reflected light beam passes through the heat sensitive medium 10 again and enters the optical fiber 13. The incident reflected light is output to the temperature measurement device 30 through the optical fiber 13. The temperature measurement device 30 measures the wavelength absorbed in the heat sensitive medium 10 based on the input reflected light beam, and then converts the measured wavelength to a temperature. Thus, the temperature of the temperature measurement object 205 is measured.

An embodiment of the temperature measurement device 30 that measures a temperature of a measurement object by using the optical temperature sensor 1 having such a configuration is described below.

[Temperature Measurement Device]

Figure 3:
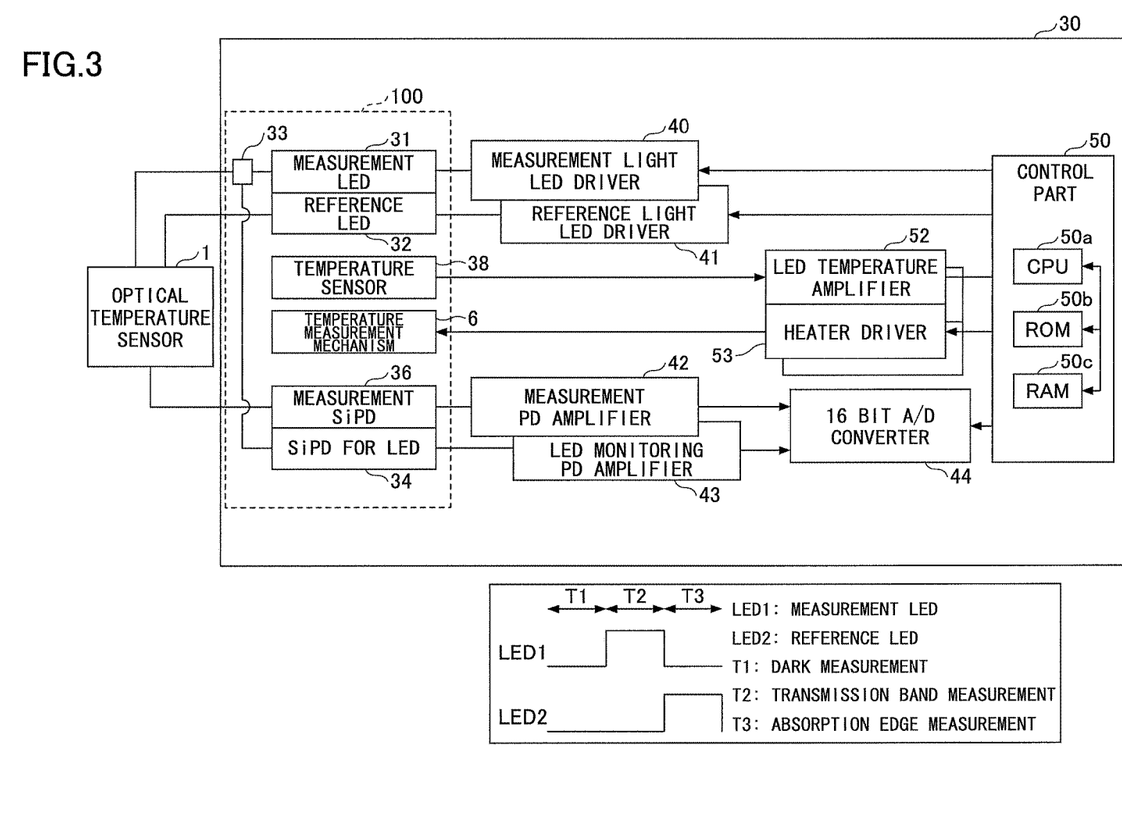
FIG. 3 is a block diagram of a temperature measurement device according to an embodiment.

FIG. 3 is a block diagram of a temperature measurement device according to an embodiment. The temperature measurement device 30 according to the embodiment includes a light emitting and receiving module 100, a measurement light LED driver 40, a reference light LED driver 41, a measurement PD (photo diode) amplifier 42, an LED monitoring PD amplifier 43, a 16 bit A/D converter 44, a control part 50, an LED temperature amplifier 52, and a heater driver 53.

(Light Emitting and Receiving Module)

Figure 4:
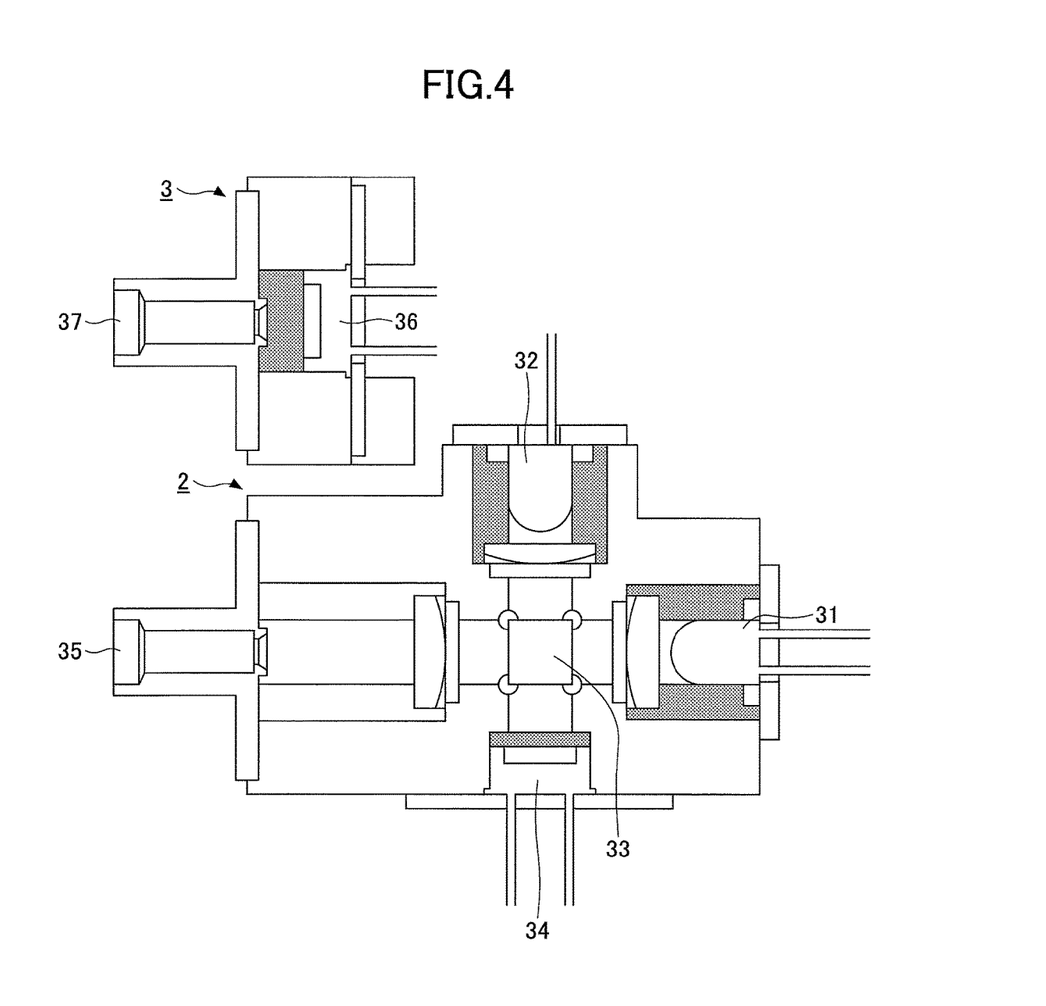
FIG. 4 is a diagram illustrating a light emitting and receiving module according to an embodiment.

The light emitting and receiving module 100 according to the present embodiment is described below with reference to FIG. 4 illustrating the light emitting and receiving module according to the embodiment. The light emitting and receiving module 100 includes a light emitting part (light emitting module) 2 that outputs a measurement light beam and a reference light beam, and a light receiving part (light receiving module) 3 that receives reflected light beams (a reflected beam of the measurement light beam and a reflected light beam of the reflected noise) with a wavelength absorbed in the heat sensitive medium 10 of the optical temperature sensor 1.

The light emitting part 2 includes a measurement LED 31, a reference LED 32, a beam splitter 33, a SiPD (silicon photo diode) for an LED 34, and an optical connector 35. The light receiving part 3 includes a measurement SiPD 36 and an optical connector 37.

The measurement LED 31 outputs a measurement light beam with a first wavelength. The measurement LED 31 outputs a light beam (measurement light beam) in a wavelength band that varies an amount of light that passes through the heat sensitive medium 10 depending on the temperature change of the heat sensitive medium 10.

The reference LED 32 outputs a reference light beam with a second wavelength. The reference LED 32 has a constant amount of light that passes through the heat sensitive medium 10 depending on the temperature of the heat sensitive medium 10, and outputs a light beam in a wavelength range that does not change the amount of light that passes through the heat sensitive medium 10 depending on the temperature change of the heat sensitive medium 10 (reference light beam).

The beam splitter 33 transmits a part of the incident measurement light beam and the incident reference beam and reflects a part of the incident measurement light beam and the incident reference beam. The light beam having passed through the beam splitter 33 is transmitted to the optical temperature sensor 1 through the optical fiber 13 connected to the optical connector 35. The light beam reflected from the beam splitter 33 enters the SiPD (silicon photo diode) for the LED 34. The SiPD for the LED 34 is a photo diode to confirm the light emission, and outputs current values depending on the amount of light of the measurement light beam and the amount of light of the reference light beam.

The measurement SiPd 36 receives the reflected light beam from the optical temperature sensor 1 through the optical fiber 13 connected to the optical connector 37. The measurement SiPD 36 outputs a current value depending on the amount of light of the incident reflected light beam.

(Configuration Other than Light Emitting and Receiving Module)

The configuration other than the light emitting and receiving module 100 included in the temperature measurement device 30 is continued to be described below with reference to FIG. 3. The LED monitoring PD amplifier 43 converts the current value output from the SiPD for the LED 34 to a voltage value and amplifies the voltage value.

The 16 bit A/D converter 44 converts an analog value of the voltage output from the LED SiPD 43 to a digital value, and inputs the converted digital value to the control part 50 as a digital monitor value.

When the monitor value fluctuates, the control part 50 performs control of changing an output value of the LED having the fluctuated monitor values (the measurement LED 31 or the reference LED 32). The control signal for changing the output value is output as a pulse value by PWM light modulation.

The control part 50 includes a CPU 50a (Central Processing Unit), a ROM 50b (Read Only Memory), a RAM 50c (Random Access Memory) and the like. The CPU 50a executes temperature calculations and temperature management according to various data stored in a memory area such as the ROM 50b. A function of the control part 50 may be implemented by using software or by using hardware.

The measurement LED driver 40 performs a feedback control of an actual current flowing through the measurement LED 31 depending on a pulse width of the control signal output from the control part 50.

The reference LED driver 41 performs a feedback control of an actual current flowing through the reference LED 32 depending on a pulse width of the control signal output from the control part 50.

Thus, the measurement light beam and the reference light beam with constant amounts of light are output from the measurement LED 31 and the reference LED 32, respectively, based on the current values controlled by the feedback control.

According to the monitor function, two kinds of emission intensities of LEDs for measurement and reference used as light sources are measured by the SiPD for the LED 34, and the light intensities of the measurement light beam and the reference light beam are controlled so as to become constant by the feedback control. Thus, even if the light intensities of the measurement LED 31 and the reference LED 32 are decreased over the years, the amounts of light of the measurement light beam and the reference light beam output from the measurement LED 31 and the reference LED 32 can be controlled to become constant by increasing the feedback current values depending on the decrease over the years. Thus, the change over the years of the temperature measurement device 30 can be prevented, and the service life of the temperature measurement device 30 can be extended while making it possible to measure the temperature precisely.

As discussed above, the measurement SiPD 36 receives the reflected light beam from the optical temperature sensor 1 through the optical fiber 13 connected to the optical connector 37. The measurement SiPD 36 outputs a current value depending on the amount of light of the input reflected light. The measurement PD amplifier 42 converts the current value output from the measurement SiPD 36 to a voltage value and amplifies the voltage value.

The 16 bit A/D converter 44 converts the analog value of the voltage output from the measurement PD amplifier 42 to a digital value, and inputs the converted digital value to the control part 50 as a measured value detected by the optical temperature sensor 1. The control part 50 converts the measured value to a temperature.

[Temperature Measurement Method]

Figure 5:
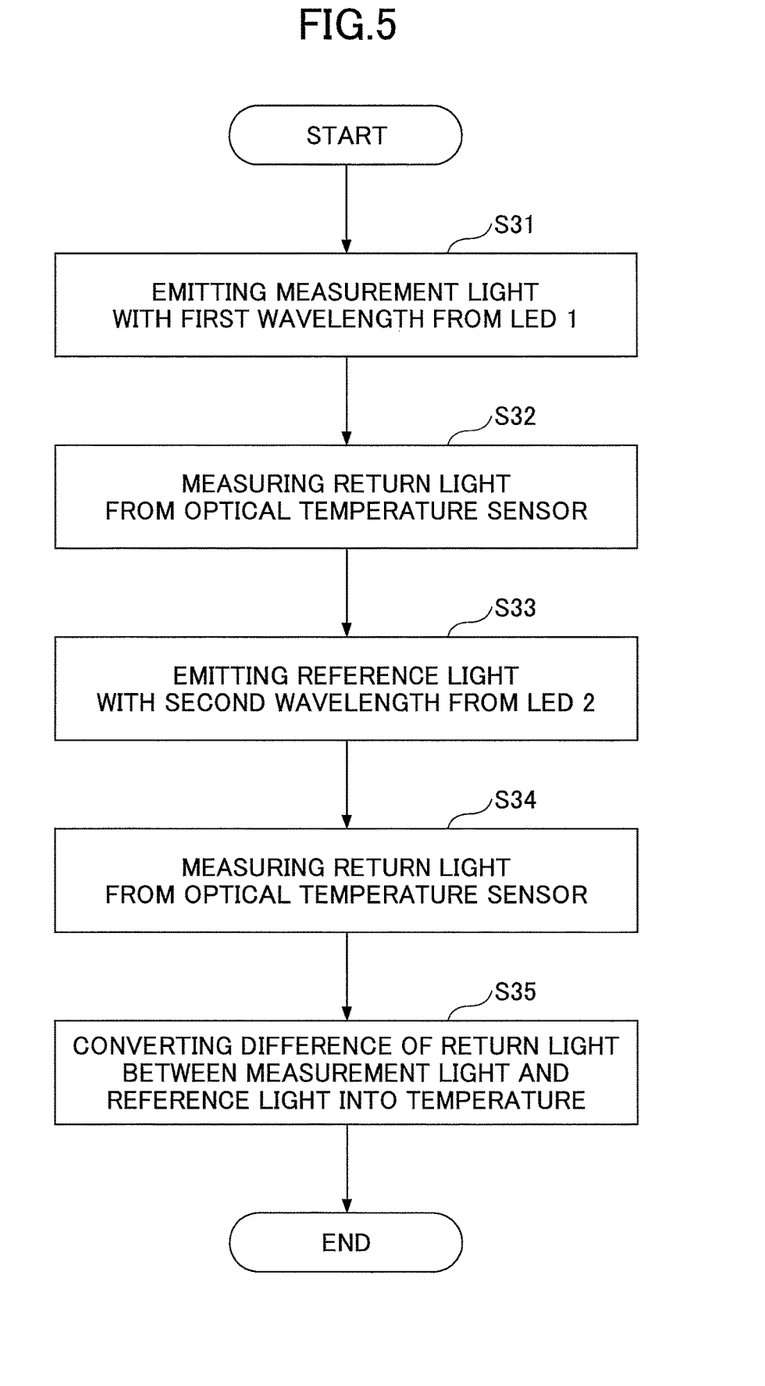
FIG. 5 is a flowchart illustrating a temperature measurement method according to an embodiment.

Next, a temperature measurement method using the temperature measurement device 30 according to an embodiment is described below with reference to FIG. FIG. 5 illustrates a flowchart illustrating the temperature measurement method according to the embodiment. Here, before performing the temperature measurement method in FIG. 5, in a period of time T1 illustrated in a lower frame of FIG. 3, an output value (initial value) of the measurement SiPD 36 in a state where neither the measurement LED 31 nor the reference LED 32 outputs a light beam is measured. Next, in a period of time T2, a reflected light beam (return light beam) that returns when the measurement LED 31 (LED 1) outputs a light beam is measured by the measurement SiPD 36. Although the periods of time T1, T2, and T3 are repeatedly performed, the temperature control when each of the period of times T1, T2 and T3 is performed one time, is described below. Moreover, although the output value (initial value) measured by the measurement SiPD 36 in the period of time T1 usually becomes a value approximately close to "0," when the output value is more than or equal to a predetermined threshold value, the measured value of the measurement light beam is corrected by subtracting the output value (initial value) from the measured value of the reflected light beam in response to the light beam output from the measurement LED 31 in the period of time T2. Similarly, when the initial value is more than or equal to a predetermined threshold value, the measured value of the reference light beam is corrected by subtracting the output value (initial value) from the measured value of the reflected light beam in response to the light beam output from the reference LED 32 in the period of time T3. In the temperature measurement method described below, a temperature measurement method when the correction does not occur is described, and the description when the correction occurs is omitted.

To begin with, in step S31, the measurement LED 31 (LED 1) outputs a measurement light beam at a first wavelength. The measurement light beam passes the optical fiber 13, is emitted from the top surface of the optical fiber 13, and passes through the heat sensitive medium 10. The measurement light beam is a light beam in a wavelength range (first wavelength) that changes an amount of light that passes through the heat sensitive medium 10 when the temperature of the heat sensitive medium 10 changes. The measurement light beam having passed through the heat sensitive medium 10 is reflected by the heat transfer aluminum plate 11 (contact surface with the measurement object). The reflected light beam of the measurement light beam passes through the heat sensitive medium 10 again and enters into the optical fiber 13 from the top surface of the optical fiber 13.

Next, in step S32, the measurement SiPD 36 receives the reflected light beam (return light beam) from the optical temperature sensor 1 that has received the reflected light beam of the measurement light beam through the optical fiber 13. The measurement SiPD 36 outputs a current value I1 depending on the amount of light thereof.

Next, in step S33, the reference LED 32 (LED 2) outputs a reference light beam with a second wavelength. The reference light beam passes through the optical fiber 13, is emitted from the top surface of the optical fiber 13, and passes through the heat sensitive medium 10. The reference light beam is a light beam in a wavelength range (second wavelength) that does not change an amount of light that passes through the heat sensitive medium 10 even if the temperature of the heat sensitive medium 10 changes. The measurement light beam having passed through the heat sensitive medium 10 is reflected by the heat transfer aluminum plate 11 (contact surface with the measurement object). The reflected light beam of the reference light beam passes through the heat sensitive medium 10 again, and enters into the optical fiber 13 from the top surface of the optical fiber 13.

Subsequently, in step S34, the measurement SiPD 36 receives the reflected light beam (return light beam) from the optical temperature sensor 1 that has received the reflected light beam of the reference light beam through the optical fiber 13. The measurement SiPD 36 outputs a current value I2 depending on the amount of light thereof.

Next, in step S35, the control part 50 obtains a ratio of the current value I1 measured from the reflected light beam of the measurement light beam to the current value I2 measured from the reflected light beam of the reference light beam, converts the ratio to a temperature, and outputs the temperature.

As discussed above, according to the temperature measurement device 30 of the present embodiment, the temperature of the temperature measurement object 205 detected by the optical temperature sensor 1 is calculated based on the reflected light beam of the measurement light beam and the reflected light beam of the reference light beam.

It has been experimentally determined that the temperature measurement device 30 of the present embodiment can perform the temperature measurement with a period of about 8.3 milliseconds. The temperature measurement can be performed in a short time compared to general temperature measurement that can be performed as a period of about 40 milliseconds.

[Temperature Adjustment Part]

In the temperature measurement by a semiconductor absorption wavelength using the optical temperature sensor 1, a measured value has a margin of error depending on the internal temperature of the light emitting module 100. This error is likely to be due to an error of the measured value caused by a change of the measured value due to a change in the ambient temperature that is close to the temperature of the measurement LED 31 and the reference LED 32. In other words, the central wavelength of an LED is shifted due to the temperature, by keeping an ambient temperature of the LED constant, stable temperature measurement can be achieved without being affected by the ambient temperature. Furthermore, the central wavelengths of the LEDs are slightly different depending on the individual LEDs. Hence, by controlling the ambient temperature of the LED to absorb the individual difference of LED, more stable temperature measurement is possible, and the individual difference as the temperature sensor can be reduced. Because of this, in the present embodiment, a temperature adjustment mechanism for separately adjusting the measurement LED 31 and the reference LED 32 is provided. The temperature adjustment part including the temperature adjustment mechanism for separately adjusting the measurement LED 31 and the reference LED 32 is described with reference to FIGS. 3 and 6.

To begin with, referring to FIG. 3, the temperature adjustment part includes the temperature sensor 38 and the temperature adjustment mechanism 6 included in the light emitting module 100, the LED temperature amplifier 52, the heater driver 53, and the control part 50, and performs temperature adjustment of the measurement LED 31 and temperature adjustment of the reference LED 32 separately from each other.

Figure 6:
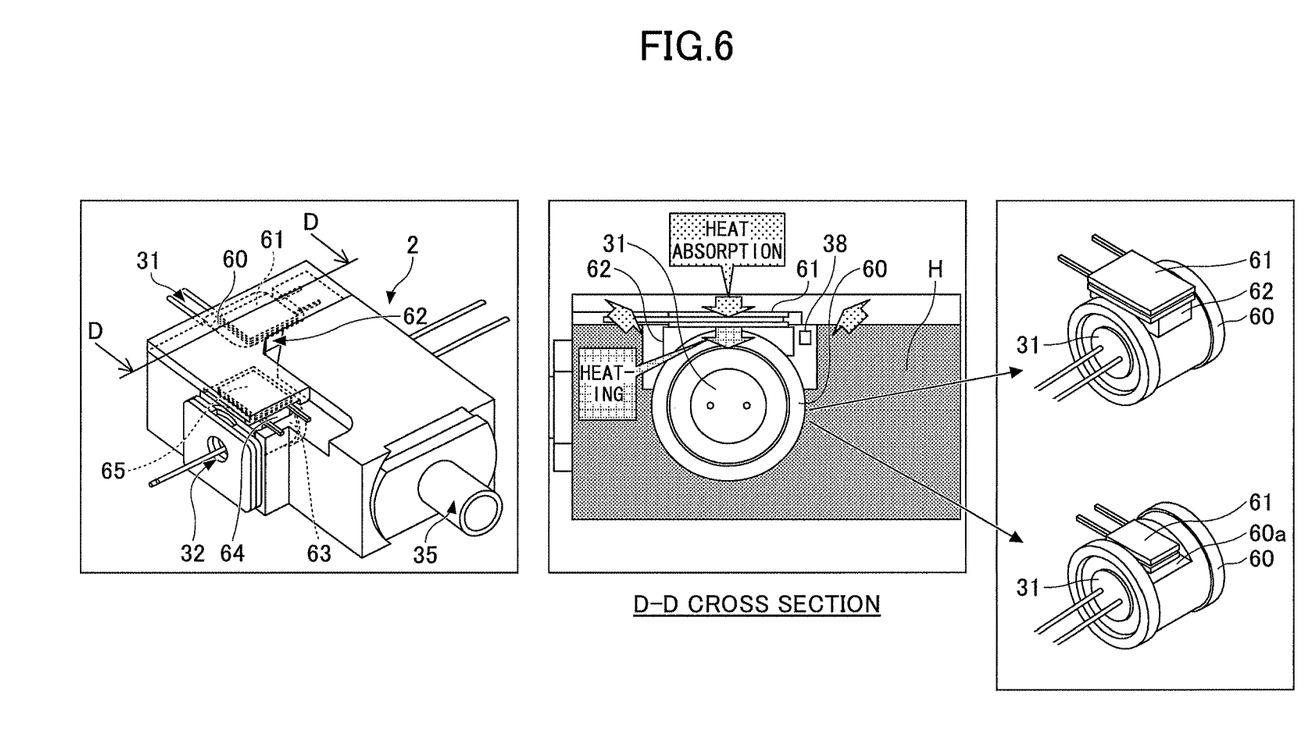
FIG. 6 is another diagram illustrating a light emitting part according to an embodiment.

Next, referring to FIG. 6, as illustrated in the left diagram of FIG. 6, the measurement LED 31 and the reference LED 32 are arranged inside the light emitting part 2. An individual temperature measurement function is provided in each of the measurement LED 31 and the reference LED 32. Describing the temperature measurement function more specifically, as illustrated in the central diagram of FIG. 6 showing a D-D cross section of the left diagram, an outer periphery of the measurement LED 31 is covered with a cylindrical member 60. An outer periphery of the reference LED 32 is similarly covered with a cylindrical member 63. The cylindrical members 60 and 63 are, for example, made of aluminum.

Peltier devices 61 and 65 are put on the upper part of the cylindrical member 60 and 63 via an aluminum plate 62 and 64 with a thickness of about 1 mm. As illustrated in the central diagram of FIG. 6, the Peltier device 61 (the description of the Peltier device 65 is omitted since the Peltier device 65 is similar to the Peltier device 61) has characteristics in which heat moves from one metal to the other metal when a current is caused to flow a joint part of two kinds of metals, thereby generating heat absorption on one surface and heat generation on the other surface. Here, the cylindrical member 60, the aluminum plate 62, and the Peltier device 61 are an example of the temperature adjustment mechanism 6 in FIG. 3, and correspond to a first temperature adjustment mechanism that heats or cools the first light source based on a temperature of the first light source. The cylindrical member 63, the aluminum plate 64, and the Peltier device 65 are an example of the temperature adjustment mechanism 6 in FIG. 3, and correspond to a second temperature adjustment mechanism that heats or cools the second light source based on a temperature of the second light source. The aluminum plates 62 and 64 may optionally be excluded from the temperature adjustment mechanism 6.

For example, as illustrated in the central diagram in FIG. 6, when current flowing through the Peltier device 61 is controlled based on a temperature sensor 38 provided near the measurement LED 31 and the lower surface of the Peltier device 61 illustrated in the central diagram in FIG. 6 is heated, the measurement LED 31 is heated through the aluminum plate 62 and the cylindrical plate 60 with high heat conductivity. When the current flowing through the Peltier device 61 is controlled based on a temperature sensor 38 provided near the measurement LED 31 and the lower surface of the Peltier device 61 illustrated in the central diagram in FIG. 6 is caused to absorb heat, the measurement LED 31 is cooled through the aluminum plate 62 and the cylindrical plate 60 with the high heat conductivity. The reference LED 32 can be similarly controlled by controlling a current flowing through the Peltier device 65, thereby heating and cooling the reference LED 32.

In a conventional light emitting module, a high-power heater was needed to adjust a temperature of overall casing. In contrast, in the temperature adjustment part according to the present embodiment, the temperatures of the measurement LED 31 and the reference LED 32 are partially adjusted. Due to this, the temperature of the measurement LED 31 and the reference LED 32 can be adjusted with a small amount of heat.

The cylindrical members 60 and 63 and a housing H surrounding the cylindrical members 60 and 63 are designed to be insulated from each other. More specifically, by providing spaces around the cylindrical members 60 and 63, contact surfaces of the cylindrical members 60 and 63 with the housing H are reduced. Not illustrated insulating rings are inserted between the cylindrical members 60 and 63 and the housing H.

With respect to a way of putting the Peltier device 61, the Peltier device 61 may be put on the aluminum plate 62 as illustrated in the right upper diagram of FIG. 6, or by forming a flat surface 60*a* in the upper part of the cylindrical member 60 as illustrated in the right lower diagram of FIG. 6, the Peltier device 61 may be put on the flat surface 60*a*. The Peltier device 65 may be similarly put on the cylindrical member 63 without inserting the aluminum plate 64 therebetween.

Returning to FIG. 3, a current value detected by the temperature sensor 38 is input to the LED temperature amplifier 52. The LED temperature amplifier 52 converts the current value to a voltage value, amplifies the voltage value, and outputs the amplified voltage value to the control part 50. The control part 50 outputs a control signal to control the current value to output to the heater depending on the input voltage value. The heater driver 53 causes desired currents to flow through the Peltier devices 61 and 65 of FIG. 6 depending on the control signal. Thus, each temperature of the measurement LED 31 and the reference LED 32 is controlled to become a desired temperature. The temperature control of the measurement LED 31 and the reference LED 32 is performed separately from each other.

Distribution of the wavelength has an individual difference from each LED. According to the present embodiment, the temperature adjustment part provided for each of the measurement LED 31 and the reference LED 32 adjusts the temperature of each LED. Thus, the individual difference and the ambient temperature of the measurement LED 31 and the reference LED 32 can be absorbed.

[Temporal Change of LED]

The amount of light emitted by an LED changes over time and gradually decreases. Hence, by actually monitoring the amount of light output from the LED and controlling the amount of light output from the LED so as to become constant, the temperature can be measured more precisely. Therefore, to monitor the amount of light of the LED, the SiPD for the LED 34 illustrated in FIGS. 3 and 4 is provided.

The SiPD for the LED 34 is a photo diode to confirm the light emission, and outputs a current value depending on the amount of light of the measurement light beam output from the measurement PED 31. An LED monitor amplifier 43 converts the current value output from the SiPD for the LED 34 to a voltage value, amplifies the voltage value, and outputs the amplifier voltage value to the control part 50.

The control unit measures the amount of light output from the SiPD for the LED 34 depending on the input voltage value, and controls the current flowing through the measurement LED 31 so as to increase depending on the decrease of the amount of light.

The measurement light LED driver 40 controls the current value flowing through the measurement LED 31 depending on a pulse width of the control signal output from the control part 50 by feedback control.

Similarly, the SiPD for the LED 34 outputs a current value depending on an amount of light of the reference light beam output from the reference LED 32. The LED monitoring PD amplifier 43 converts the current value output from the SiPD for the LED 34 to a voltage value, amplifies the voltage value, and outputs the amplified voltage value to the control part 50.

The control part 50 measures the amount of light output from the SiPD for the LED 34 depending on the input voltage value, and performs control of increasing a current flowing through the reference LED 32 depending on the decrease of the amount of light.

The reference LED driver 41 performs feedback control on the current value flowing through the reference LED 32 depending on the pulse width.

The above-discussed configuration enables the amount of light output from the LED depending on the temporal change of the LED to be kept constant by monitoring the amount of light output from the measurement LED 31 and the reference LED 32.

Here, the SiPD for the LED 34 corresponds to a monitoring part to monitor the amount of light of the measurement light beam and the reference light beam. The measurement LED 31 corresponds to a first light source that outputs a measurement light beam with a first wavelength. The reference LED 32 corresponds to a second light beam source that outputs a measurement light beam with a second wavelength.

[Examples of Effects]

Figure 7:
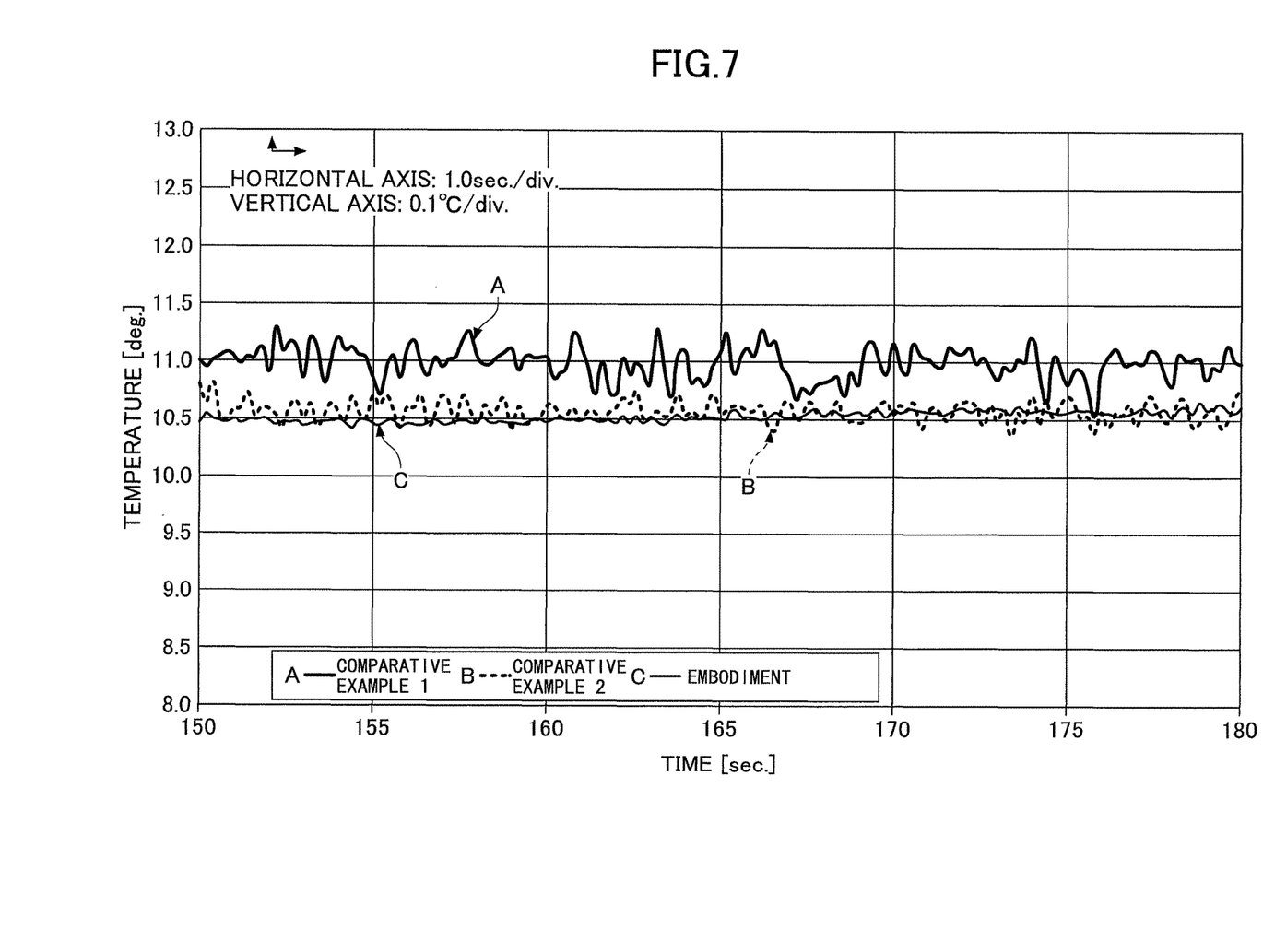
FIG. 7 is an example of a temperature measurement result (stability) according to an embodiment.
Figure 8:
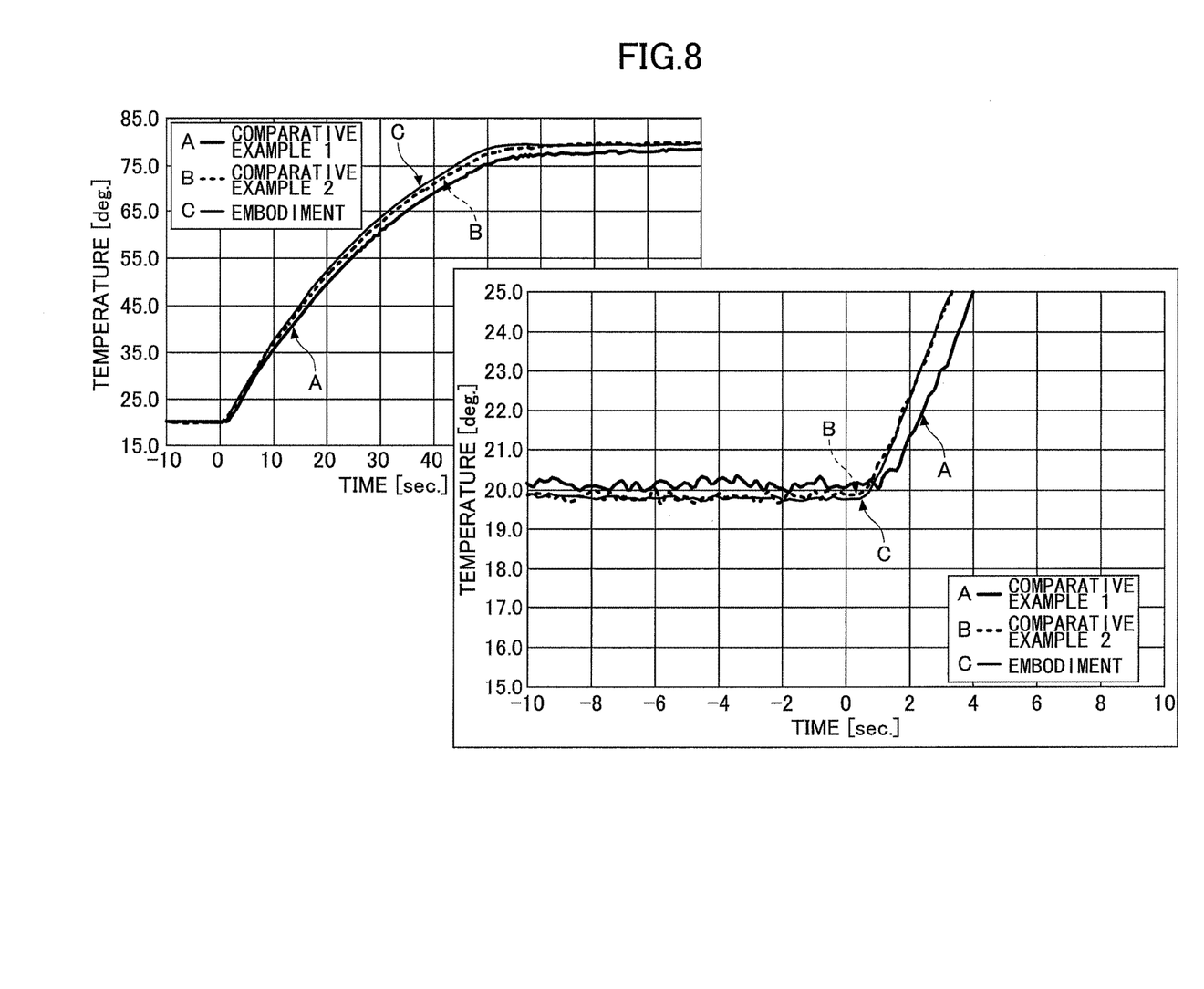
FIG. 8 is an example of a temperature measurement result (responsiveness) according to an embodiment.
Figure 9:
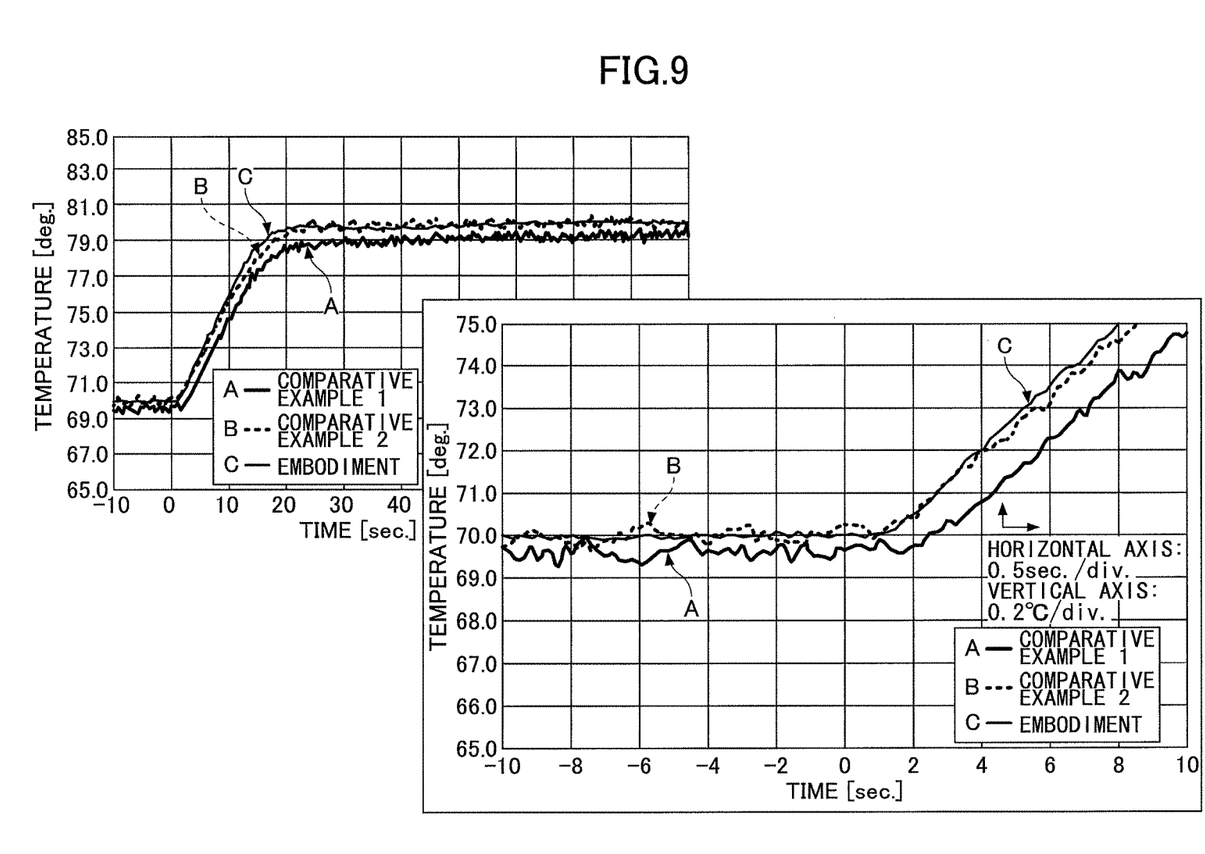
FIG. 9 is an example of a temperature measurement result (responsiveness) according to an embodiment.

FIGS. 7 through 9 illustrate examples of temperature measurement results according to the present embodiment. In FIGS. 7 through 9, the horizontal axis shows time (seconds), and the vertical axis shows a surface temperature (° C.) of a temperature measurement object. FIG. 7 shows detection values detected by respective temperature sensors of the present embodiment, and comparative examples 1 and 2 when the time shown in the horizontal axis passed without changing the surface temperature of the temperature measurement object.

According to this, the optical temperature sensor 1 of the present embodiment has the lowest dispersion of the temperature of the temperature sensors of the comparative examples 1 and 2 and the optical temperature sensor 1 of the present embodiment. The temperature sensor of the comparative example 1 has about twice as much dispersion as the optical temperature sensor 1 according to the present embodiment, and the temperature sensor of the comparative example 2 has about three times as much dispersion as the optical temperature sensor 1 according to the present embodiment. As discussed above, it is noted that the optical temperature sensor 1 according to the present embodiment exhibits excellent output characteristics and stability.

Moreover, FIG. 8 shows detection values detected by respective temperature sensors of the present embodiment, and the comparative examples 1 and 2 while the time shown in the horizontal axis had passed when the surface temperature of the temperature measurement object was controlled so as to become in a range of 20° C. to 70° C. According to this, the optical temperature sensor 1 of the present embodiment and the temperature sensor of the comparative example 2 have responsiveness higher than the responsiveness of the temperature sensor of the comparative example 1. Furthermore, when looking at the detection values of the temperature sensors at a neighborhood of a rising portion of temperature changes shown in the right enlarged view, it is noted that the optical temperature sensor 1 of the present embodiment has dispersion fewer than the dispersion of the temperature sensor of the comparative example 2. As discussed above, it is noted that the optical temperature sensor 1 of the present embodiment excels in output characteristics, stability and responsiveness.

In addition, FIG. 9 shows detection values detected by respective temperature sensors of the present embodiment and the comparative examples 1 and 2, while the period of time shown in the horizontal axis had passed, under the condition that the surface temperature of the temperature measurement object was controlled so as to become in a range of 70° C. to 80° C. According to this, the optical temperature sensor 1 of the present embodiment and the temperature sensor of the comparative example 2 have responsiveness higher than the responsiveness of the temperature sensor of the comparative example 1. Furthermore, when looking at the detection values of the temperature sensors at a neighborhood of a rising portion of temperature changes shown in the right enlarged view, it is noted that the optical temperature sensor 1 of the present embodiment has dispersion lower than the dispersion of the temperature sensor of the comparative example 2. As discussed above, it is noted that the optical temperature sensor 1 of the present embodiment excels in output characteristics, stability and responsiveness.

As discussed above, according to the present embodiment, a top surface of an optical fiber and a heat sensitive medium is arranged so as to face each other at positions separated by a predetermined distance. Thus, an optical temperature sensor excellent in accuracy, responsiveness and stability can be provided. Moreover, according to the present embodiment, a method of manufacturing a low-cost optical temperature sensor that satisfies predetermined performance can be provided. Furthermore, according to the temperature measurement device 30 of the present embodiment, temperature measurement can be performed in a short time. In addition, according to the temperature measurement device 30 of the present embodiment, the amount of light output from the measurement LED 31 and the reference LED 32 can be controlled so as to become constant. Thus, a change over the years as the temperature measurement device 30 can be reduced, and duration of service can be extended.

In addition, according to the temperature measurement device 30 of the present embodiment, a temperature adjustment part provided in each of the measurement LED 31 and the reference LED 32 adjusts each temperature of each LED. Thus, it is possible to compensate for differences in the ambient temperature as measured by the measurement LED and the reference LED.

As discussed above, the embodiments of the optical temperature sensor and the method of manufacturing the optical temperature sensor have been described. Moreover, the embodiments of the temperature measurement device, the light emitting module and the temperature measurement method have been described. However, the present invention is not limited to the above embodiments, but various modifications and improvements can be made without departing from the scope of the invention. Moreover, the embodiments and modifications can be combined as long as they are not contradictory to each other.

For example, an optical temperature sensor, a temperature measurement device and a temperature measurement method of the present invention are applicable to temperature detection of an electrostatic chuck installed in an etching apparatus, an ashing apparatus, and a film deposition apparatus and the other parts.

The present application is based on and claims the benefit of priority of Japanese Patent Application No. 2014-042138 filed on Mar. 4, 2014, the entire contents of which are herein incorporated by reference.

DESCRIPTION OF THE REFERENCE NUMERALS 1 optical temperature sensor
2 light emitting part
3 light receiving part
6 temperature adjustment mechanism
10 heat sensitive medium
11 heat transfer aluminum plate
12 holding cylinder
12a cutout part
12b protruding part
13 optical fiber
14 securing member
14a shoulder falling part
15 spring
30 temperature measurement device
31 measurement LED
32 reference LED
33 beam splitter
34 SiPD for an LED
35 optical connector
36 measurement SiPD
37 optical connector
38 temperature sensor
40 measurement light LED driver
41 reference light LED driver
42 measurement PD amplifier
43 LED monitoring PD amplifier
44 16 bit A/D converter
50 control unit
52 LED temperature amplifier
53 heater driver
60, 63 cylindrical member
61, 65 Peltier device
62, 64 aluminum plate
100 light emitting module

The invention claimed is:

1. A temperature measurement device comprising:
a light emitting part including a first light source configured to output a measurement light beam at a first wavelength and a second light source configured to output a reference light beam at a second wavelength;
a light receiving part configured to receive a reflected light beam of the measurement light beam and a reflected light beam of the reference light beam, the reflected light beam of the measurement light beam and the reflected light beam of the reference light beam having passed through a temperature sensing device that changes light transmission characteristics with changes in temperature;
an optical temperature sensor that contains a temperature sensing device and an optical fiber therein;
a control part configured to measure a temperature detected by the temperature sensing device based on an amount of light of the received reflected light beam of the measurement light beam and an amount of light of the received reflected light beam of the reference light beam; and
a temperature adjustment part configured to adjust a temperature of the first light source and a temperature of the second light source separately from each other,
wherein the temperature sensing device and a top end surface of the optical fiber are apart from each other, and
wherein a distance between the temperature sensing device and the top end surface of the optical fiber is adjustable.

2. The temperature measurement device as claimed in claim 1, further comprising:
a monitoring part configured to monitor an amount of light of the measurement light beam output from the first light source and an amount of light of the reference light beam output from the second light source,
wherein the control part respectively controls the amount of light of the measurement light beam output from the first light source and the amount of light of the reference light beam output from the second light source based on the monitored amount of light of the measurement light beam and the monitored amount of light of the reference light beam.

3. The temperature measurement device as claimed in claim 1, wherein the temperature adjustment part includes
a plurality of temperature sensors configured to respectively detect a temperature of the first light source and a temperature of the second light source,
a first temperature adjustment mechanism configured to heat or cool the first light source based on the detected temperature of the first light source, and
a second temperature adjustment mechanism configured to heat or cool the second light source based on the detected temperature of the second light source.

4. The temperature measurement device as claimed in claim 3,
wherein the light emitting part includes a housing to house the first light source and the second light source, and
wherein a space is provided at least in a part between the housing and the first temperature adjustment mechanism and between the housing and the second temperature adjustment mechanism.

5. A light emitting module comprising:
a first light source configured to output a measurement light beam at a first wavelength;
a second light source configured to output a reference light beam at a second wavelength; and
a temperature adjustment part configured to adjust a temperature of the first light source and a temperature of the second light source separately from each other; and
an optical temperature sensor that contains a temperature sensing device and an optical fiber therein;

wherein the temperature sensing device and a top end surface of the optical fiber are apart from each other, and wherein a distance between the temperature sensing device and the top end surface of the optical fiber is adjustable.

6. A temperature measurement method, the method comprising steps of:

outputting a measurement light beam with a first wavelength from a first light source;

outputting a reference light beam with a second wavelength from a second light source;

receiving a reflected light beam of the measurement light beam and a reflected light beam of the reference light beam, the reflected light beam of the measurement light beam and the reflected light beam of the reference light beam having passed through a temperature sensing device that changes light transmission characteristics with changes in temperature via an optical fiber provided in an optical temperature sensor, the temperature sensing device and a top end surface of the optical fiber being apart from each other;

measuring a temperature detected by the temperature sensing device based on an amount of light of the received reflected light of the measurement light beam and an amount of light of the received reflected light beam of the reference light beam; and adjusting a temperature of the first light source and a temperature of the second light source separately from each other; and adjusting a distance between the temperature sensing device and the top end surface of the optical fiber.

* * * * *